United States Patent Office 2,803,523
Patented Aug. 20, 1957

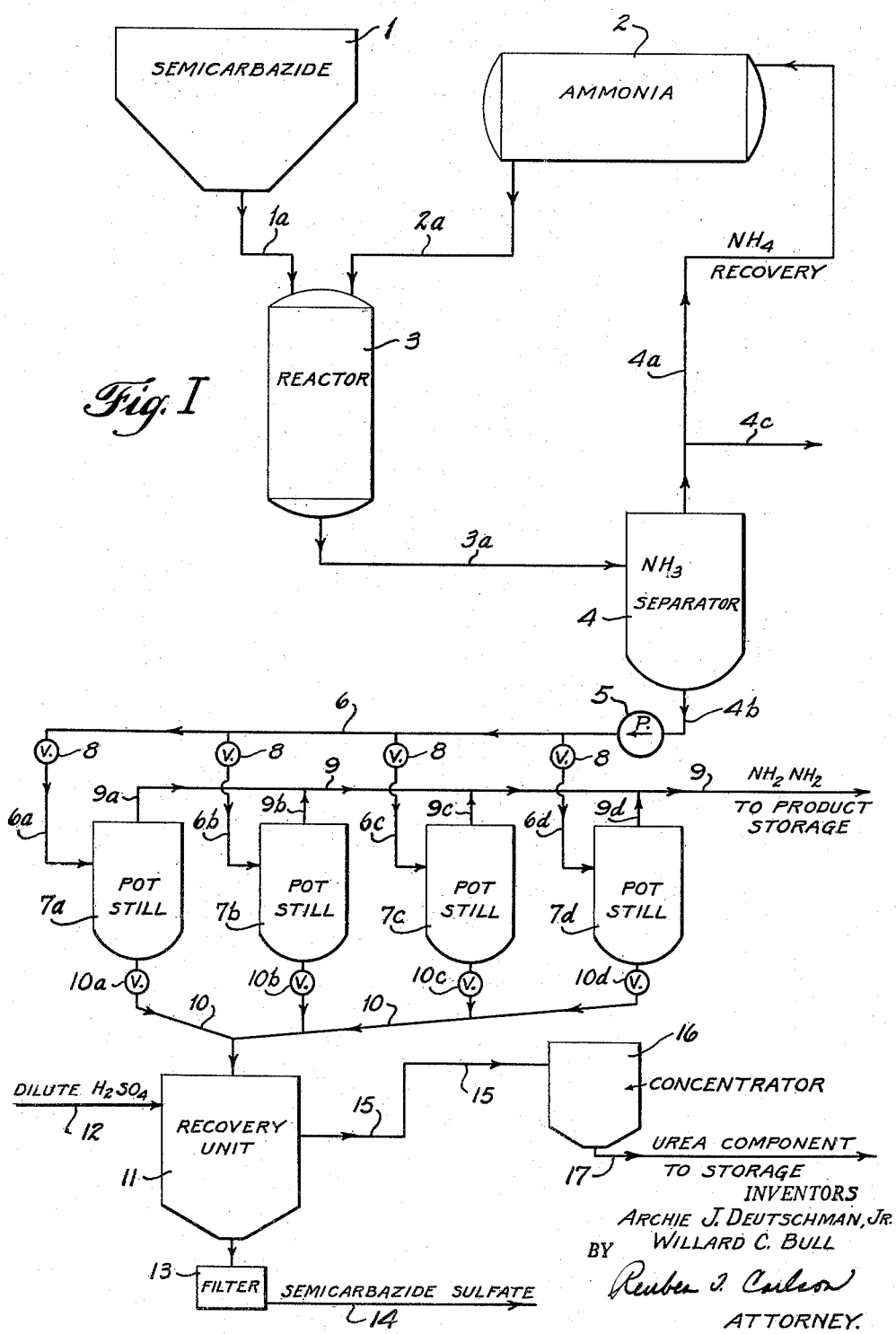

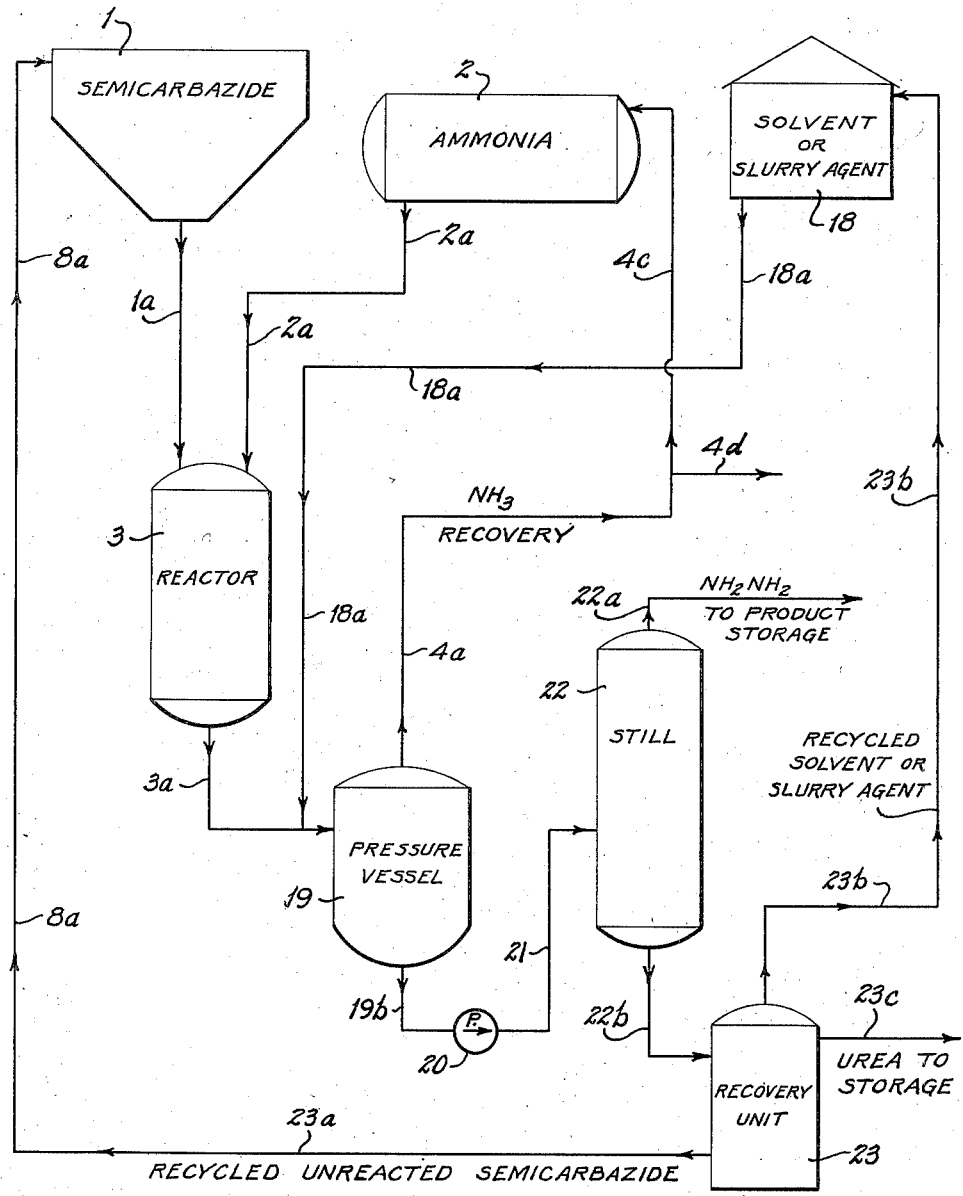
Fig. II
INVENTORS
ARCHIE J. DEUTSCHMAN, JR.
WILLARD C. BULL
BY
Reuben J. Carlson
ATTORNEY.

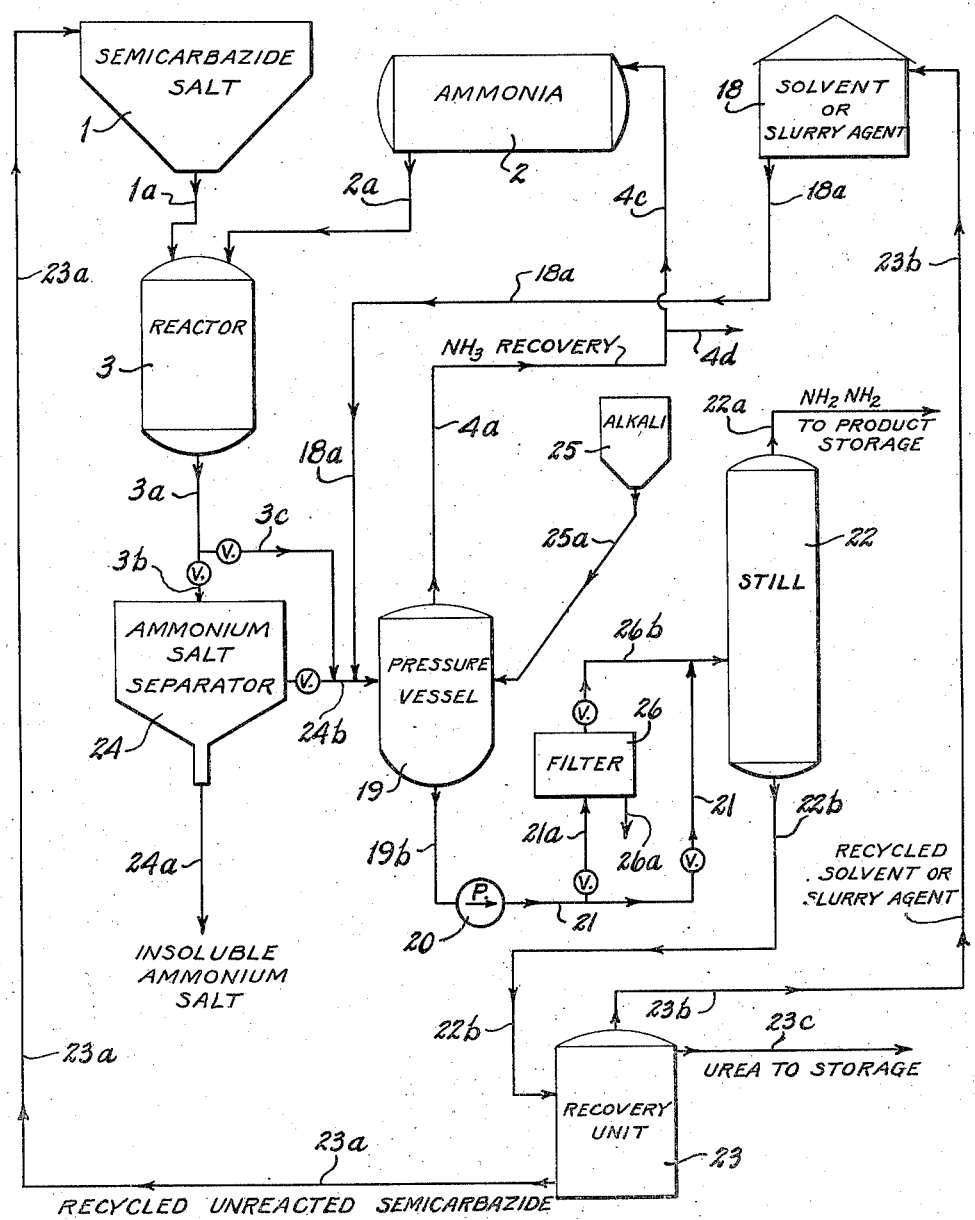
Fig. III

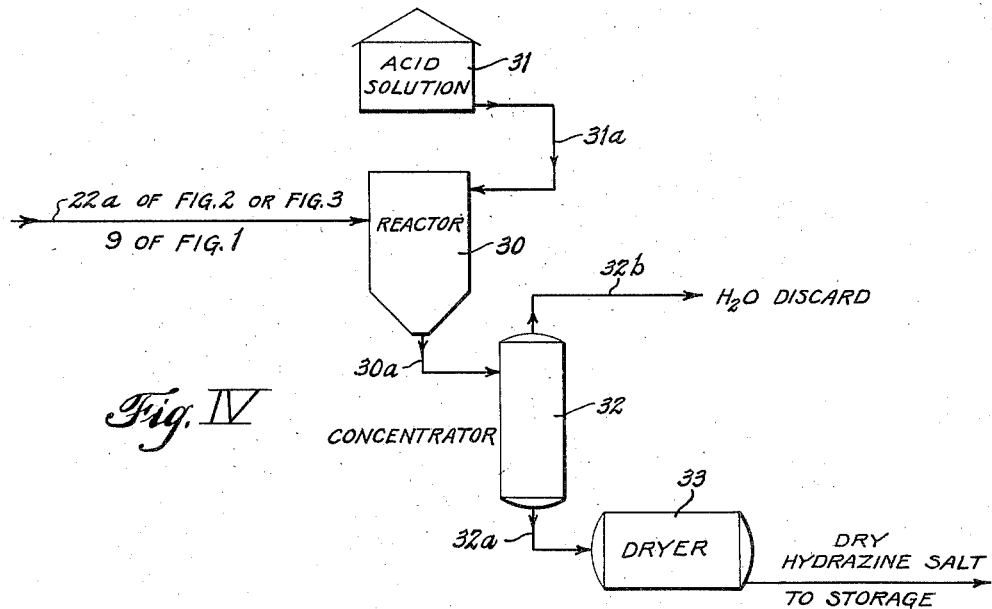
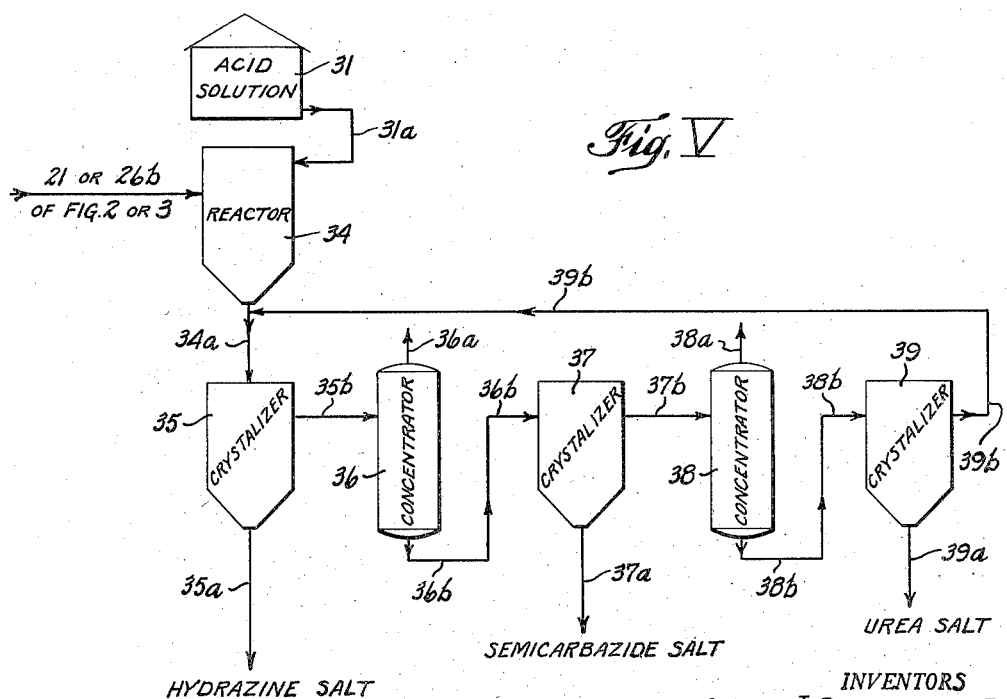

2,803,523

PROCESS FOR MAKING HYDRAZINE AND ITS DERIVATIVES

Archie John Deutschman, Jr., Columbus, Kans., and Willard Clare Bull, Joplin, Mo., assignors to Spencer Chemical Company, Kansas City, Mo., a corporation of Missouri Application October 28, 1950, Serial No. 192,781

7 Claims. (Cl. 23—190)

This invention relates to the preparation of hydrazine and its derivatives, and more particularly to an improved process for the direct production of hydrazine and its derivatives at substantially less cost than by methods heretofore employed, and which additionally yields valuable by-products which are directly utilized in industry and agriculture.

Hydrazine and its derivatives possess many unique properties which make their use especially desirable and advantageous. For example, hydrazine and its derivatives find advantageous use, either alone or in combination with other chemicals, as highly effective reducing agents in various chemical processes, and in the synthesis of important pyrazolone compounds made by reacting hydrazine with esters of the beta-ketonic acids. Hydrazine also finds advantageous use as a constituent in the compounding of high energy propulsion fuels of unique and powerful properties.

While many of the unique and advantageous uses for hydrazine and its derivatives are generally known and recognized in the chemical industry, these products have heretofore not found extensive application due to their high price, as reflected by high costs of manufacture in accordance with methods presently practiced. Hydrazine and its derivatives are now generally produced in the form of dilute aqueous solutions requiring expensive and complicated procedures and equipment, and the consumption of large amounts of power and heat energy, to concentrate and purify the solution into commercially acceptable products. Additionally, present methods of manufacture require close processing control and careful supervision of each step in the operation to avoid the formation of undesired compounds. Present processing methods also result in substantial waste of input materials, and the production of by-product materials in forms which have little or no use in industry or agriculture and are consequently generally discarded as waste.

It has been the customary prior art practice to manufacture hydrazine by preparing an aqueous mixture containing ammonia or urea and sodium hypochlorite as the essential raw material ingredients, yielding a reaction product in the form of a very dilute aqueous solution of hydrazine containing only 2% to 4% hydrazine. To reduce this dilute aqueous hydrazine solution to desired commercial products, such as anhydrous hydrazine, hydrated hydrazine of 57 mole percent concentration, or to a more concentrated aqueous hydrazine in form suitable for commercial application, requires extensive and costly evaporation, distillation and chemical treating operations which has made the desired end product very high in cost.

This improved process is flexibly adapted for the direct production of hydrazine and its selected derivatives in their desired commercial end use forms, by the employment of relatively simple processing steps and relatively inexpensive processing equipment, and the consumption of relatively small amounts of power and heat energy, which requires a minimum of processing control and supervision, which results in the attainment of high volume and continuous production output with high conversion yields of the desired end product at relatively low cost, and which additionally yields valuable by-products useful in industry or agriculture without waste of input raw materials.

Other objects and advantages of this invention will become apparent to those skilled in the art as the disclosure proceeds.

This invention contemplates the use of semicarbazide or one of the semicarbazide salts and ammonia as starting materials. Semicarbazide, which is also sometimes referred to in the chemical arts as semicarbazine, carbamic hydrazide, hydrazinoformamide or carbazinamide, constitutes a raw material which when reacted with ammonia in proportions of one mole of semicarbazide to from ten to twenty moles of ammonia at a reaction temperature of from 50° to 200° C., permits the direct production of the desired commercial end product without requiring costly and time-consuming evaporation, distillation or chemical treating procedures, and which additionally yields urea as a valuable by-product.

In the production of substantially anhydrous hydrazine or its selected salt, for example, a corresponding substantially anhydrous semicarbazide or its salt may be used as the starting material. In the production of hydrated hydrazine of 57 mole percent concentration, sufficient water in the nature of approximately 36 mole percent, may be added to the semicarbazide raw material to yield the desired hydrated hydrazine. Similarly, if an aqueous solution of hydrazine or its selected salt of specified concentration is desired as the end product, a correspondingly proportioned amount of water may be added to the semicarbazide to produce the specific hydrazine end product desired.

In accordance with this improved process, semicarbazide, to which a predetermined quantity of water may be added to produce the desired hydrazine end product, is reacted with an excess of ammonia in an autoclave at a temperature in the range of 50° to 200° C. and preferably within the range of 100° to 150° C. The reaction mixture thus produced is withdrawn from the autoclave and conducted into an ammonia evaporator or still where the unreacted ammonia is flashed off for reuse.

In the event a semicarbazide salt is used as starting material, the reaction mixture will contain an ammonium salt constituent. In some cases the ammonium salt can be directly removed from the reaction mixture and the remainder then processed as above indicated. In all other cases the ammonium salt may be disposed of by treating the reaction mixture with an alkali, the ammonium salt being thereby decomposed to free ammonia and the alkali salt of the ion that was initially associated with the semicarbazide. In this form all excess ammonia can be readily flashed off, leaving a reaction mixture containing essentially urea, some unreacted semicarbazide, alkali salt and hydrazine.

By suitable distillation of the reaction mixture, the hydrazine in its commercially desired form is obtained, such as anhydrous hydrazine, and/or aqueous solution of hydrazine of the desired concentration. Assuming there is no water present in the reaction mixture, the hydrazine will distill off as an overhead product at approximately 113° C. at atmospheric pressure and substantially pure anhydrous hydrazine thus directly recovered. If the reaction mixture contains water, as added in the proper proportions to the semicarbazide raw material, the maximum boiling mixture will distill off at approximately 120° C. If water has been added to the semicarbazide raw material in proportionate amounts to yield an aqueous solution of hydrazine of a particular concentration, the excess water or anhydrous hydrazine as the case may be will first distill off and flow to the recovery vessel, followed by the distillation of the maximum boiling composition, to provide a recovered aqueous end product, after mixing the entire overhead product, of the desired hydrazine concentration. It is preferable to carry out the distillation operation at reduced pressures and correspondingly reduced temperatures to minimize hydrazine decomposition.

After recovery of the hydrazine, the bottoms product containing urea and some unreacted semicarbazide, may be further treated to remove the valuable by-product urea, and the remaining unreacted semicarbazide can then be recycled back to the semicarbazide storage vessel for reuse.

This invention is applicable to the direct and low-cost production of not only substantially pure anhydrous hydrazine, but also of many desirable derivatives of hydrazine which find commercial and industrial application, such as hydrated hydrazine, various hydrazine solutions of specified concentration, various hydrazine salts such as hydrazine sulfate, and numerous other derivatives and intermediate compounds.

As a further exemplification of this improved process, reference is made to the accompanying drawings, in which:

Fig. I is a schematic flow diagram illustrating the application of this process in its simpler form for the direct production of hydrazine of predetermined commercial or end use grade from semicarbazide and ammonia, additionally yielding urea as a valuable by-product.

Fig. II is another schematic flow diagram of the improved process wherein a urea dissolving or slurrying agent is added to the hydrazine containing reaction mixture as produced in the first step of the process, to thereby further facilitate the rapid and continuous distillation and recovery of the desired hydrazine end product and thereby additionally provide a flowable bottoms product from which the urea and unreacted semicarbazide may be conveniently and readily separated.

Fig. III is a further schematic flow diagram of this improved process wherein a semicarbazide salt is reacted with ammonia, and wherein the ammonium salt formed in the first reaction is either directly separated or otherwise decomposed with an alkali and then separated from the reaction mixture prior to the recovery of the unreacted ammonia and the desired hydrazine end product;

Fig. IV is a schematic flow diagram showing the manner in which a selected hydrazine salt may be produced from the hydrazine recovered in the process illustrated in Figs. I, II or III; and Fig. V is a schematic flow diagram illustrating an alternative method for making a selected hydrazine salt by adding the corresponding acid to the reactants as produced in the process shown in Figs. II or III to provide a further reaction mixture from which the desired hydrazine salt may be extracted.

Similar reference characters refer to similar parts throughout the several views of the drawings and this specification.

The production of substantially pure anhydrous hydrazine by this process may proceed in accordance with the following equation:

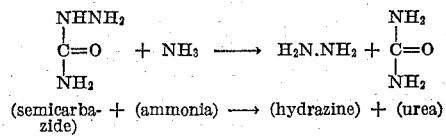

(semicarba- + (ammonia) ⟶ (hydrazine) + (urea)
zide)

In the production of substantially anhydrous hydrazine in accordance with the above equation, the operation is carried out under substantially anhydrous conditions. As indicated in the flow diagram shown in Fig. I, substantially anhydrous semicarbazide used as the starting material is transported from supply vessel 1 through line 1a into an autoclave or reaction vessel 3. Liquid or gaseous ammonia is run from supply tank 2 through line 2a into the reaction vessel 3 in the proportions of approximately 10 to 20 moles of ammonia to one mole of semicarbazide. These starting materials are thoroughly mixed and heated in the reaction vessel 3 to a temperature of 50° to 200°, with an optimum temperature from 100° to about 150° C., the vessel 3 being so constructed as to withstand the pressure generated at this operating temperature. As the reaction proceeds, a reaction mixture is formed comprising hydrazine, some unreacted semicarbazide, urea and some unreacted ammonia.

When the major part of the semicarbazide has combined with the ammonia to form hydrazine, the reaction mixture may be withdrawn from the reaction vessel 3 and run through line 3a into a still or ammonia separator 4 where any remaining unreacted ammonia may be flashed off and recovered in overhead line 4a and then either returned by line 4a to the ammonia tank 2, or drawn off through line 4C and used for other purposes. The first reaction mixture, comprising hydrazine, unreacted semicarbazide and urea may then be drawn off from the separator 4 through line 4b. Various procedures may thereafter be employed to separate the hydrazine component of this reaction mixture from the unreacted semicarbazide and urea components.

Hydrazine in substantially pure anhydrous form may be separated from the unreacted semicarbazide and urea by simple distillation procedures. For example, the reaction mixture may be withdrawn from the separator 4 through line 4b as a bottoms product and pumped by pump 5 through line 6 to distillation equipment where substantially pure anhydrous hydrazine may be recovered as an overhead product, leaving the urea and unreacted semicarbazide as a bottoms product. To insure recovery of a substantially pure anhydrous product and to avoid substantial decomposition of the unreacted semicarbazide, it is desirable to carry out the distillation operation at a temperature not substantially higher than 115° C.

The distillation operation can be effectively carried out in a series of pot stills, such as pot stills 7a, 7b, 7c and 7d as indicated in Fig. I, which are supplied with the reaction mixture from pump line 6 through the corresponding branch lines 6a, 6b, 6c and 6d. The flow of the reaction mixture to the respective pot stills may be conveniently controlled by suitable control valves 8 in the respective branch supply lines. The desired hydrazine end product is recovered overhead through a recovery line 9 connected to the respective pot stills as by branch lines 9a, 9b, 9c and 9d.

If the semicarbazide raw material as used contains substantially no water or other liquid and is substantially dry, substantially anhydrous hydrazine will be directly recovered from the stills through recovery line 9. However, if the water addition to the semicarbazide raw material is properly proportioned, the maximum boiling mixture of hydrazine and water will be recovered; but if the water content of the raw material is less than such balanced amount, corresponding amounts of hydrated hydrazine and substantially anhydrous hydrazine will be recovered, and if more water is added than such balanced amount, it will be appreciated that in addition to the hydrated hydrazine, water vapor will distill off before the maximum boiling mixture is secured.

When distillation recovery of the hydrazine in its desired end product form has been completed, it will be appreciated that the bottoms product left in the still will be substantially dry. The relatively dry bottoms product may be removed through branch outlets 10a, 10b, 10c and 10d respectively controlled by suitable dry valves and run into a conveyor line 10 as shown in Fig. I to the urea recovery unit 11.

The relatively dry bottoms product as run into the recovery unit 11 comprises essentially urea and some unreacted semicarbazide. These constituents may be separated and recovered by running dilute sulfuric acid through line 12 into the recovery unit 11. The dilute sulfuric acid is added to the recovery unit 11 in the proper amount to react with any remaining semicarbazide which is more basic and less soluble than urea. The reaction mixture thus produced in the recovery unit 11 comprises urea, traces of urea sulfate, and semicarbazide sulfate all in aqueous solution, and precipitated semicarbazide sulfate. The precipitated semicarbazide sulfate may be withdrawn as a bottoms product from the recovery unit 11, recovered in a filter 13 and then run to storage through line 14. This semicarbazide sulfate is itself a valuable by-product, and if desired may be used as a starting raw material in the process illustrated in Fig. III.

The remaining fraction comprising an aqueous solution of urea and traces of urea sulphate and possibly traces of semicarbazide sulfate, may be drawn off from the recovery unit 11 through line 15, suitably concentrated as desired in a concentrator 16, and then run through line 17 to storage to provide a valuable urea containing by-product useful in compounding agricultural fertilizers. It will be appreciated that other procedures may be employed to recover the urea and semicarbazide constituents of the bottoms product run into the recovery unit 11, and the use of sulfuric acid to effect their separation and recovery as above explained is intended as illustrative only.

While in its most simplified form, this process contemplates the direct recovery of the desired hydrazine end product by distillation as an overhead product, leaving unreacted semicarbazide and urea as a bottoms product, production operations may be materially facilitated and manufacturing costs reduced by adding to the first reaction mixture as produced in the reactor 3, a selected compound or agent incapable of appreciable reaction with the hydrazine and semicarbazide constituents, but otherwise capable of dissolving or slurrying the bottoms product to produce a flowable mixture. There are numerous compounds available which have the characteristics of dissolving or slurrying the bottoms products without appreciable reaction with either semicarbazide or hydrazine. Such agents may be found in the general class of the ethers, alcohols and hydracarbons which distill above 120° C., as for example, the diamyl ethers, dibutyl ethers, amyl bromide, amyl alcohols, 2-hexanol, 3-hexanol, the octanes and branched chain nonanes.

In carrying out this improved process as a continuous and high production operation, it is desirable to withdraw the first reaction mixture, comprising hydrazine, unreacted semicarbazide and urea, from the reaction vessel or autoclave 3 as shown in Fig. II and conduct the mixture through discharge line 3a into a low pressure vessel 19 equipped with a suitable agitator where the solvent or slurry agent is thoroughly mixed with the first reaction mixture. The solvent or slurry agent may be withdrawn from a tank 18 and run into the low pressure vessel 19 or its feed line 3a through agent supply line 18a. The mixing takes place in vessel 19 under substantially room temperature conditions, to produce a second mixture comprising hydrazine, unreacted semicarbazide, urea, and the solvent or slurrying agent. The free ammonia is flashed off from vessel 19 and conducted through line 4a to storage line 4c or line 4d for other uses.

The reduction of the bottoms product to solution or slurry form, substantially facilitates the distillation and recovery of the desired hydrazine from the second reaction mixture. The bottoms product is withdrawn from the low pressure vessel 19 through line 19b and is driven by pump 20 through feed line 21 into a distillation column 22 which preferably is operated at reduced pressures to minimize hydrazine and semicarbazide decomposition, and is heated to distill off the hydrazine at the reduced pressure. Hydrazine will normally distill off at about 113° C. at atmospheric pressure. The hydrazine and such water as may be contained in the raw material semicarbazide in tank 1 is recovered by line 22a from the distillation column 22 as an overhead product, and urea, unreacted semicarbazide and slurry agent are recovered as a flowable bottoms product.

The resultant bottoms product, comprising urea and unreacted semicarbazide in solution or slurry form, can be conveniently tapped off from the distillation column 22 through line 22b as shown in Fig. II and run into a recovery unit 23 where the bottoms product mixture can be separated by conventional methods such as evaporation and/or fractional crystallization into its three components. The recovered unreacted semicarbazide may be drawn off through line 23a and returned to supply tank 1 for reuse, the solvent or slurry agent recovered and returned through recovery line 23b to its storage tank 18, and the recovered urea drawn off through line 23c and conveyed to storage. The recovered urea constitutes a valuable by-product which can be used to provide the fixed nitrogen constituent of agricultural fertilizer or used for other purposes.

This improved process, as thus operated, permits continuous production of the desired hydrazine as the main end product, recovery of the formed urea as a valuable by-product, and the extraction of the unreacted semicarbazide and the solvent or slurry agent for reuse, without substantial loss of valuable input materials.

This process also contemplates the production of hydrazine using a selected semicarbazide salt as a starting material, which may be desirable where a salt of semicarbazide is conveniently available. For example, semicarbazide may be most conveniently available in the form of one of its various salts such as the sulfate, phosphate, oxalate, fluoride, chloride, bromide, acetate, nitrate or other salt, all of which can be selectively used as starting material, with or without entrained water.

The recovery of hydrazine from a selected semicarbazide salt used as a starting material, proceeds substantially as in the case where semicarbazide is used as shown in Fig. II, except that the ammonium salt as produced in the first reaction is either removed as an insoluble ammonium salt or otherwise decomposed with an alkali.

Thus where an anhydrous semicarbazide salt is used, which when reacted with ammonia yields a salt component which is substantially insoluble in ammonia, such as the sulfate, phosphate, oxalate and fluoride ammonia salts, the relatively insoluble ammonium salt thus formed may be directly extracted as a precipitate by filtration, decantation or centrifugation, leaving the desired hydrazine, urea and unreacted semicarbazide for further separation.

Where a substantially anhydrous semicarbazide salt is used as starting raw material of a type which when reacted with ammonia produces a reaction mixture which includes an ammonium salt component which is substantially insoluble in liquid ammonia, such as the phosphate, oxalate, fluoride and sulfate salts, the formed ammonium salt may be removed directly from the reaction mixture immediately following the first reaction step as indicated in Fig. III. Taking the semicarbazide salt of a generalized acid of formula HX as an example of the raw material used, the process will proceed in accordance with the following equation:

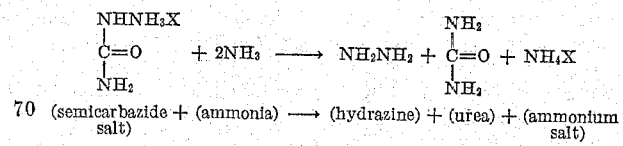

(semicarbazide) + (ammonia) ⟶ (hydrazine) + (urea) + (ammonium salt)

In proceeding as indicated in the above equation, the anhydrous semicarbazide salt such as the sulfate, phosphate, oxalate or fluoride would be withdrawn from storage vessel 1 as shown in Fig. III and supplied by conveyor 1a to the autoclave 3 along with ammonia supplied by line 2a, in the proportions of approximately 1 mole of semicarbazide salt to approximately 20 moles of ammonia. The reaction would be effected by heating the mixture to a temperature of 50° to 200° C. and preferably in the range of approximately 100° to 150° C., producing a reaction mixture comprising hydrazine, urea, some unreacted semicarbazide and the insoluble ammonium salt.

After equilibrium conditions between the semicarbazide salt and ammonia has been reached, the reaction mixture is withdrawn from the reactor 3 through discharge line 3a and 3b as shown in Fig. III, and run into a salt separator 24 for separation of the ammonium sulfate, phosphate, oxalate or fluoride from the reaction mixture. Separation of the insoluble ammonium salt can be easily effected by decantation, filtration or centrifugation, the recovered ammonium salt being withdrawn as a by-product through line 24a. The remaining constituents comprising hydrazine, some reacted semicarbazide, urea and unreacted ammonia are removed from the separator 24 and conducted through line 24b into the low pressure vessel 19.

Thereafter further processing proceeds as shown in Fig. II and above described, wherein a solvent or slurrying agent is withdrawn from its container 18 through line 18a and conducted into pressure vessel 19 where the slurry agent is thoroughly mixed with the urea, hydrazine and unreacted semicarbazide as heretofore described. After flashing off the unreacted ammonia through line 4a, which may be recycled through line 4c to ammonia storage or withdrawn through branch line 4d and used for other purposes, the second reaction mixture produced in vessel 19 is withdrawn as a bottoms product through line 19b and pumped as by pump 20 through line 21 to the distilling column 22 as shown in Figs. II and III.

The hydrazine is recovered from distillation column 22 as an overhead product through line 22a and the remaining bottoms fraction comprising the slurrying agent, unreacted semicarbazide and urea are withdrawn through line 22b and conducted into a recovery unit 23. The fraction conducted into the recovery unit 23 may be readily separated into its three components by evaporation, decantation or fractional crystallization, the recovered unreacted semicarbazide component being drawn off through line 23a and returned to the supply tank 1 for reuse, the slurry agent component separated and returned by recovery line 23b to its storage tank 18, and the recovered urea drawn off through line 23c and conveyed to storage. Thus it will be appreciated that substantially anhydrous hydrazine may be easily produced by the use of relatively simple processing equipment and procedures where a substantially anhydrous semicarbazide sulfate, phosphate, oxalate or fluoride is used as the starting raw material.

Where a semicarbazide salt used as starting material is not anhydrous but contains an appreciable water content, or where the semicarbazide salt is of such a character as to yield when reacted with ammonia a salt component which is relatively soluble in liquid ammonia, such as ammonium chloride, bromide, acetate or nitrate, the ammonium salt cannot readily be removed as by a salt separator 24 as shown in Fig. III, but can best be removed by the addition of an alkali such as lime or caustic to the reactants.

Thus where the starting semicarbazide salt contains water or comprises a semicarbazide chloride, bromide, acetate, nitrate or like ammonia soluble salt, the reaction mixture is withdrawn from the reactor 3 through line 3a, by-passed around ammonia separator 24 through line 3c as shown in Fig. III, and is conducted directly into the low pressure vessel 19 and there mixed with the slurrying agent supplied through line 18a.

A suitable alkali such as lime or caustic supplied from storage vessel 25 is conducted by conveyor 25a to the low pressure vessel 19 which is equipped with a suitable stirring device which thoroughly mixes the alkali, slurrying agent, hydrazine, unreacted semicarbazide, urea, free ammonia and the ammonia insoluble ammonium salt and water or the ammonia soluble ammonium salt. The alkali reacts with the ammonium salt ($NH_4X$) produced as in the previous equation to yield free ammonia and the alkali salt. While various alkali compounds may be used for the purpose, such as NaOH, KOH, and $Ca(OH)_2$, quick lime may be taken as typical to illustrate the reaction as in the following equation, where X represents the characteristic acid radical:

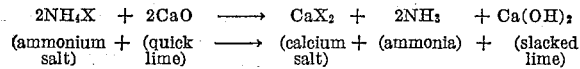

$$2NH_4X + 2CaO \longrightarrow CaX_2 + 2NH_3 + Ca(OH)_2$$
(ammonium salt) + (quick lime) $\longrightarrow$ (calcium salt) + (ammonia) + (slacked lime)

In event the reactants introduced into the low pressure vessel 19 through line 24b contain an ammonia soluble ammonium salt, in addition to the hydrazine, urea, unreacted semicarbazide, and slurrying agent components, the alkali salt may then be conveniently removed by the use of filtering apparatus 26 connected to by-pass line 21a leading from the pump 20. The filter 26 operates to remove the insoluble alkali salt as a precipitate which may be withdrawn through line 26a as a by-product. The remaining hydrazine, urea, slurrying agent, and unreacted semicarbazide are then withdrawn from the filter through line 26b and run into the distillation column 22.

With the insoluble alkali salt thus removed, the desired hydrazine will be recovered from the distillation column 22 through line 22a as an overhead product, and the bottoms product comprising essentially unreacted semicarbazide, urea and slurrying agent is withdrawn from the distillation column as a bottoms product through line 22b for separation and recovery in the recovery unit 23 in the manner heretofore explained.

In the event the reaction mixture withdrawn from the vessel 19 contains an ammonia insoluble-water soluble ammonium salt which cannot be effectively removed by filtration in the filtering apparatus 26, all of the reactants can be pumped directly from pressure vessel 19 through line 21 into the distillation column 22 where the hydrazine is recovered as before as an overhead product through line 22a. The water constituent, if present, will vaporize in the distillation column 22 and may be removed as through the hydrazine line 22a.

With the water constituent thus removed, the ammonia insoluble, water soluble alkali salt will precipitate out at the bottom of the distillation column 22. The bottoms product comprising unreacted semicarbazide, urea, slurrying agent and precipitated alkali salt may then be withdrawn from the still through line 22b and conducted into suitable recovering apparatus 23 where the bottoms product can be separated as by decantation, evaporation and/or fractional crystallation into the urea and alkali salt as by-product constituents, and into slurrying agent and unreacted semicarbazide for recycle.

This invention also contemplates the production of various selected hydrazine salts which find commercial and industrial application. Among the more commonly used hydrazine salts which can be advantageously made within the contemplation of this invention may be mentioned the hydrazine sulfates, chlorides, oxalates, phosphates, fluorides, acetates and formates.

The selected hydrazine salt may be simply and conveniently made by this process by reacting an aqueous solution of the corresponding selected acid directly with the hydrazine recovered by this process. For example, the hydrazine recovered in the process shown in Fig. I in end product line 9, or the hydrazine recovered in the process shown in Fig. II or Fig. III as discharged through end product line 22a, is run into a reaction vessel 30 as shown in Fig. IV and thoroughly mixed with the selected acid in aqueous solution supplied through line 31a from the acid storage tank 31. The acid constituent of the mixture is so calculated as to produce the desired hydrazone salt with substantially no excess acid remaining. The water constituent in the hydrazine acid mixture should be sufficient to provide for adequate removal of the heat of reaction so that the temperature of the reaction is kept below about 100° C.

The hydrazine salt solution withdrawn from the acid reactor 30 through line 30a may be conducted into a suitable concentrator or evaporator 32 where the aqueous solution of hydrazine salt may be concentrated to an end product hydrazine salt of the desired flowable concentration and the removed water discarded through line 32b. If desired, the concentrated hydrazine salt may be withdrawn from the concentrator 32 and run through discharge line 32a into a suitable dryer 33 where the same may be crystallized and dried to a relatively dry or anhydrous hydrazine salt.

While in most cases it is preferable to acidulate the hydrazine after it has been separated and removed from its reaction mixture, it will be appreciated that the reaction mixture discharged through line 21 as shown in Figs. II and III and containing hydrazine, ureau, some unreacted semicarbazide, slurry agent and with or without water, or the reaction mixture discharged through line 26b shown in Fig. III containing hydrazine, ureau, unreacted semicarbazide, slurrying agent and with or without an alkali salt and/or water, may be neutralized with a calculated amount of a selected acid in an acid reactor 34 as shown in Fig. V to thereby produce a mixture containing the selected hydrazine salt, in which case the hydrazine constituent will react with the acid to produce the hydrazine salt in accordance with the following formula:

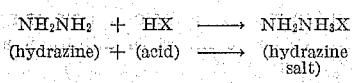

The selected acid addition, supplied from acid tank 31 through line 31a is a calculated amount to effectuate the desired acidulation of the components, with substantially no excess of acid remaining.

Any remaining semicarbazide will also react with the acid in accordance with the following formula:

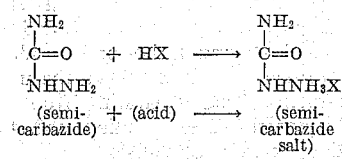

The urea will also react with the selected acid in accordance with the following formula:

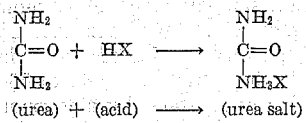

The reaction mixture as thus acidulated will contain as its mixture components the desired hydrazine salt, a small amount of the corresponding semicarbazide salt, the corresponding urea salt, slurry agent, and possibly also an alkali salt and some water. This mixture may then be separated into its several components by conventional procedures, such as evaporation, crystallization, concentration, decantation, or centrifugation in accordance with the solubility of its various components.

It will be appreciated that the sequence of separation of the various constituents resulting from acidulation of the reaction mixture will obviously vary with the characteristics of the acid used as indicated by the salt solubilities of the particular salt system employed. Without limiting the foregoing, there is given by way of illustrative example only, one possible separation procedure which may be employed as illustrated in Fig. V.

As shown in Fig. V by way of exemplification, the acidulated reactants from the reactor 34 may be run through line 34a to a crystallizer 35 which could operate to precipitate one of the formed salts, such as the hydrazine salt, to be withdrawn through line 35a. The mother liquor may then be withdrawn from the crystallizer 35 through line 35b and run into a concentrator 36 where the mother liquor would be concentrated, as by evaporation, thereby effectuating removal of one or more of the evaporable constituents through line 36a, as, for example, water and/or the slurrying agent. The remaining concentrated mother liquid fraction removed from the concentrator 36 through line 36b may be run into a second crystallizer 37 where a second salt, as for example the semicarbazide salt, may be precipitated out and removed through line 37a. Where the precipitate removed from the second crystallizer 37 comprises semicarbazide salt, this salt may be run to storage or recycled back to the semicarbazide storage tank 1 as shown in Fig. III.

The mother liquor remnant left in the crystallizer 37 after removal of certain of the salts and evaporable constituents, may be further processed for final recovery of the remaining constituents by running the mother liquor remnant through line 37b into a second concentrator 38 where any remaining evaporable component may be removed through line 38a. The concentrated remnant removed from the concentrator 38 through line 38b may be run to a third crystallizer 39 where the remaining salts, such as the urea salt, may be precipitated out and removed through line 39a, to provide a third salt by-product useful in industry or agriculture in accordance with its characteristics. The remaining fraction may be recycled through line 39b back to an appropriate point for retreatment or reuse in the processing system, or the remaining fraction may be further treated, as by concentrating, crystallizing, centrifuging, decanting or other treatment steps to separate and recover the remaining constituents.

It will now be appreciated that hydrazine as well as numerous hydrazine salts, in anhydrous form or in the form of of aqueous solutions of desired concentration, may be flexibly produced by following the teachings of this process, and whereby continuous, low-cost and economical production of hydrazine and its derivatives may be achieved by the employment of relatively simple processing steps and relatively inexpensive processing equipment. Additionally, this improved process permits production of the desired end products from semicarbazide or almost any one of its available salts, eithe dry or in aqueous solution. This process and various adaptations thereof as evident to those skilled in the art from the above disclosure, can be operated with the consumption of relatively small amounts of power and heat energy, and with a minimum of processing control and supervision, with the attainment of high conversion yields of desired end products, and the recovery of valuable by-products useful in industry or agriculture substantially without waste of valuable input materials.

While certain embodiments of this improved process have been shown and described to illustrate the broad aspects of this invention, it will be understood that various modifications and changes may be made in this process, as indicated to those skilled in the art by the end product desired, the reaction conditions created, the raw materials used, and the attainment of desirable economies in operation, without departing from the spirit of this invention.

What is claimed is:

1. A continuous process for making hydrazine which includes, reacting a semicarbazide salt whose corresponding ammonium salt is insoluble in ammonia with excess ammonia in the mole ratio of one mole of semicarbazide compound to from 10 to 20 moles of ammonia at a reaction temperature in the range of 50° C. to 200° C., continuing the reaction at substantially autogenous pressure until equilibrium conditions have been substantially established to thereby provide a first reaction mixture, forming a second reaction mixture by adding to said first reaction mixture an inert dispersing agent substantially incapable of reaction with hydrazine and semicarbazide and distillable above 120° C. at atmospheric pressure, reducing the pressure and flashing off the unreacted ammonia from said second reaction mixture for re-use and leaving a residue containing the inert dispersing agent, a hydrazine fraction, a formed urea fraction and an unreacted semicarbazide fraction, heating the residue under reduced pressure conditions to a temperature below 120° C. and recovering the hydrazine as a distillate, and thereafter separating the inert dispersing agent, the formed urea fraction, and the unreacted semicarbazide fraction for re-use.

2. A continuous process for making hydrazine which includes, reacting a semicarbazide salt whose corresponding ammonium salt is insoluble in ammonia with an excess of ammonia in the mole ratio of one mole of semicarbazide salt to from 10 to 20 moles of ammonia at a reaction temperature in the range of 50° C. to 200° C., continuing the reaction at substantially autogenous pressure until equilibrium conditions have been substantially established to thereby provide a first reaction mixture, precipitating and removing the formed and insoluble ammonia salt from the reaction mixture, forming a second reaction mixture by adding to said first reaction mixture an inert dispersing agent substantially incapable of reaction with hydrazine and semicarbazide and distillable above 120° C. at atmospheric pressure, reducing the pressure of said second reaction mixture and flashing off the unreacted ammonia therefrom for re-use, heating the residue under reduced pressure conditions to a temperature below 120° C. and recovering the hydrazine fraction as a distillate leaving the formed urea fraction, the unreacted semicarbazide fraction and the inert dispersing agent as a bottoms product, and thereafter separating the formed urea fraction, the unreacted semicarbazide fraction and the inert dispersing agent for re-use.

3. A continuous process for making hydrazine which includes, reacting a semicarbazide salt whose corresponding ammonium salt is insoluble in ammonia with excess ammonia in the mole ratio of one mole of semicarbazide salt to from 10 to 20 moles of ammonia at a reaction temperature in the range of 50° C. to 200° C., continuing the reaction at substantially autogenous pressure until equilibrium conditions have been substantially established in the reaction mixture, precipitating and removing the formed and insoluble ammonium salt from the reaction mixture, thereafter reducing the pressure and flashing off the unreacted ammonia for re-use leaving a residue containing a formed urea fraction, an unreacted semicarbazide fraction and a hydrazine fraction, heating the residue under reduced pressure conditions to a temperature below 120° C. and recovering the hydrazine fraction as a distillate and leaving the formed urea fraction and the unreacted semicarbazide fraction as a bottoms product, and separating the formed urea fraction and the unreacted semicarbazide fraction for re-use.

4. A continuous process for making hydrazine which includes, reacting semicarbazide sulfate with excess ammonia in the mole ratio of one mole of semicarbazide sulfate to from 10 to 20 moles of ammonia at a reaction temperature in the range of 50° C. to 200° C., continuing the reaction at substantially autogenous pressure until equilibrium conditions have been substantially established in the reaction mixture, precipitating and recovering the formed and insoluble ammonium sulfate fraction from the reaction mixture, reducing the pressure and flashing off the unreacted ammonia for re-use leaving a residue containing a formed urea fraction, an unreacted semicarbazide fraction and a hydrazine fraction, heating the residue under reduced pressure conditions to a temperature below 120° C. and recovering the hydrazine fraction as a distillate leaving the formed urea fraction and the unreacted semicarbazide fraction as a bottoms product, and separating the formed urea fraction and the unreacted semicarbazide fraction for re-use.

5. A continuous process for making hydrazine which includes, reacting a semicarbazide salt with excess ammonia in the mole ratio of one mole of semicarbazide compound to from 10 to 20 moles of ammonia at a reaction temperature in the range of 50° C. to 200° C., continuing the reaction at substantially autogenous pressure until equilibrium conditions have been substantially established to thereby provide a first reaction mixture, forming a second reaction mixture by adding to said first reaction mixture an inert dispersing agent substantially incapable of reaction with hydrazine and semicarbazide and distillable above 120° C. at atmospheric pressure, reducing the pressure and flashing off the unreacted ammonia from said second reaction mixture for re-use and leaving a residue containing the inert dispersing agent, a hydrazine fraction, a formed urea fraction and an unreacted semicarbazide fraction, heating the residue under reduced pressure conditions to a temperature below 120° C. and recovering the hydrazine as a distillate, and thereafter separating from the remaining bottoms product the formed urea fraction and the unreacted semicarbazide fraction for re-use.

6. A continuous process for making hydrazine which includes, reacting a semicarbazide salt whose corresponding ammonium salt is soluble in ammonia with excess ammonia in the mole ratio of one mole of semicarbazide salt to from 10 to 20 moles of ammonia at a reaction temperature in the range of 50° C. to 200° C., continuing the reaction at substantially autogenous pressure until equilibrium conditions have been substantially established in the reaction mixture, thereafter reducing the pressure and flashing off the unreacted ammonia for re-use, adding an alkali to the residue to form a second reaction mixture, heating the second reaction mixture under reduced pressure conditions to a temperature below 120° C. and recovering the hydrazine fraction as a distillate and leaving a bottoms product which includes the formed urea fraction and the unreacted semicarbazide fraction, and separating from said bottoms product the formed urea fraction and the unreacted semicarbazide fraction for re-use.

7. A continuous process for making hydrazine which includes, reacting a semicarbazide salt whose corresponding ammonium salt is soluble in ammonia with excess ammonia in the mole ratio of one mole of semicarbazide salt to from 10 to 20 moles of ammonia at a reaction temperature in the range of 50° C. to 200° C., continuing the reaction at substantially autogenous pressure until equilibrium conditions have been substantially established in the reaction mixture, thereafter reducing the pressure and flashing off the unreacted ammonia for re-use, adding an alkali to the residue to form a second reaction mixture, removing the formed alkali salt, heating the residue under reduced pressure conditions to a temperature below 120° C. and recovering the hydrazine fraction as a distillate and leaving a bottoms product which includes the formed urea fraction and the unreacted semicarbazide fraction, and separating from said bottoms product the formed urea fraction and the unreacted semicarbazide fraction for re-use.

References Cited in the file of this patent
UNITED STATES PATENTS
2,717,200    Hanford               Sept. 6, 1955